United States Patent
Zhou et al.

(10) Patent No.: US 12,099,785 B2
(45) Date of Patent: Sep. 24, 2024

(54) OPTIMIZATION METHOD AND SYSTEM FOR HYBRID FRP AND STEEL BARS

(71) Applicant: Shenzhen University, Guangdong (CN)

(72) Inventors: Yingwu Zhou, Guangdong (CN); Biao Hu, Guangdong (CN); Youbin Lan, Guangdong (CN); Xiaoxu Huang, Guangdong (CN); Feng Xing, Guangdong (CN)

(73) Assignee: Shenzhen University, Guangdong (CN)

( * ) Notice: Subject to any disclaimer, the term of this patent is extended or adjusted under 35 U.S.C. 154(b) by 0 days.

(21) Appl. No.: 18/545,983

(22) Filed: Dec. 19, 2023

(65) Prior Publication Data
US 2024/0211652 A1    Jun. 27, 2024

(30) Foreign Application Priority Data
Dec. 23, 2022  (CN) .......................... 202211666300.4

(51) Int. Cl.
*G06F 30/20*   (2020.01)
*G01N 3/28*    (2006.01)
*G06F 111/10*  (2020.01)

(52) U.S. Cl.
CPC ............... *G06F 30/20* (2020.01); *G01N 3/28* (2013.01); *G06F 2111/10* (2020.01)

(58) Field of Classification Search
CPC ........ G06F 30/20; G06F 2111/10; G01N 3/28
See application file for complete search history.

(56) References Cited

U.S. PATENT DOCUMENTS

| 4,979,992 A * | 12/1990 | Bache .................. C04B 35/505 |
| | | 106/713 |
| 6,189,286 B1 * | 2/2001 | Seible ...................... E04C 3/44 |
| | | 52/834 |

(Continued)

OTHER PUBLICATIONS

First Office Action issued by the State Intellectual Property Rights Bureau in relation to Chinese Application No. 202211666300.4 dated Jun. 14, 2023 (4 pages) along with English language translation (5 pages).

(Continued)

*Primary Examiner* — Tung S Lau
(74) *Attorney, Agent, or Firm* — Robert P. Michal, Esq.; Carter, DeLuca & Farrell LLP

(57) ABSTRACT

The present disclosure relates to an optimization method and system for hybrid FRP and steel bars. The optimization method includes: determining a cross-sectional bending bearing capacity, a maximum cross-sectional bending bearing capacity, and a minimum cross-sectional bending bearing capacity according to basic material parameters and a design value of a bending moment; determining whether the cross-sectional bending bearing capacity, the maximum cross-sectional bending bearing capacity, and the minimum cross-sectional bending bearing capacity meet a first preset condition; if yes, determining a maximum steel bar area according to the basic material parameters; determining a maximum ductility of a steel bar beam; determining whether the maximum ductility and the target ductility meet a second preset condition; if yes, determining a minimum steel bar area and a maximum FRP bar area according to the maximum steel bar area; and determining an actual steel bar area and an actual FRP bar area.

7 Claims, 4 Drawing Sheets

(56) References Cited

U.S. PATENT DOCUMENTS

| | | | |
|---|---|---|---|
| 9,890,546 B2* | 2/2018 | Ehsani | E04G 23/0218 |
| 2003/0188667 A1* | 10/2003 | Beard | C04B 26/02 |
| | | | 106/644 |
| 2015/0013252 A1* | 1/2015 | Sharif | E04C 3/29 |
| | | | 52/223.8 |
| 2022/0112718 A1* | 4/2022 | Tanaka | E04C 5/127 |

OTHER PUBLICATIONS

Notification of Granting Patent Right issued by the State Intellectual Property Rights Bureau in relation to Chinese Application No. 202211666300.4 dated Aug. 17, 2023 (1 page) along with English language translation (2 pages).

* cited by examiner

OPTIMIZATION METHOD AND SYSTEM FOR HYBRID FRP AND STEEL BARS

CROSS REFERENCE TO RELATED APPLICATION

This patent application claims the benefit and priority of Chinese Patent Application No. 202211666300.4, filed with the China National Intellectual Property Administration on Dec. 23, 2022, the disclosure of which is incorporated by reference herein in its entirety as part of the present application.

TECHNICAL FIELD

The present disclosure relates to the field of hybrid reinforcement, and in particular, to an optimization method and system for hybrid fiber reinforced polymer (FRP) and steel bars.

BACKGROUND

Reinforced concrete structures, which have been most extensively used in civil engineering at present, have the advantages of good ductility and low construction costs. However, in marine environments and saline-alkali soil environments, rich chloride ions, sulfate ions, and wet-dry cycles may cause erosion to the concrete and steel bars. After the high alkaline environment provided by the concrete disappears, the steel bars will rapidly corrode with rust, and since the rust is a crushable oxide and is incapable of further preventing corrosion, the bearing capacity of the structure will rapidly decrease, resulting in a huge potential safety hazards and maintenance cost for the reinforced structures during service life.

As one of the solutions, the above concerns can be effectively avoided by using the FRP material. This is because glass FRP (GFRP), aramid FRP (AFRP), basalt FRP (BFRP), and carbon FRP (CFRP) have much better corrosion resistance than steel bars, and CFRP has much higher tensile strength than steel bars. However, correspondingly, due to the characteristic of linear elasticity of the FRP material, pure FRP bar reinforced concrete structures suffers a brittle failure. In the case of the under-reinforced condition, FRP bars may be ruptured suddenly. In case of over-reinforced condition, the concrete is crushed. In the case of balanced condition, concrete crushing and FRP rupture occur simultaneously. Compared with the failure mode of sudden rupture of FRP bars, the failure mode of concrete crushing is more acceptable because of the relatively slow damage process. Therefore, failure under over-reinforced condition is recommended in both ACI440 and Chinese GB50608 guidelines, which will inevitably increase the pressure in cost. Moreover, to prevent the corrosion of steel bars, a greater thickness of a protective concrete layer is recommended to be used to prevent or postpone the corrosive media from penetrating into the concrete.

Therefore, scholars have tried to use the form of the hybrid steel bars and FRP bar. According to such a method, on the one hand, since steel bars are used, the steel bars have yielded before members are damaged and the structure has obvious deformation, and the characteristic of sudden damage of a purely FRP reinforced concrete beam is solved. On the other hand, FRP bars and steel bars are arranged reasonably with FRP bars in the lower layer and steel bars in the upper layer. That is, the FRP bars and the steel bars are arranged in two layers, and the FRP bars are arranged outside and the steel bars are arranged inside. In this way, the outside FRP bars may be regarded as a protective layer for the steel bars due to their outstanding corrosion resistance to prevent the corrosion of the inside steel bars. Moreover, since the FRP material is arranged outside and does not reach an ultimate failure strain after the yielding of the steel bars, the FRP can provide the bearing capacity continuously.

However, due to the mixing of two materials and the different mechanical properties, the bearing capacity and ductility of concrete structures using hybrid steel/FRP reinforcements differ from that of the traditional steel-reinforced ones. Thus, bearing capacity and the ductility of hybrid steel/FRP reinforced concrete structures need to be calculated by dedicated formulas. Currently, scholars have proposed formulas for the bearing capacity of hybrid steel/FRP reinforced concrete structures, most of which are similar with minor differences. However, there are different opinions for ductility calculation methods. For example, the ductility may be calculated according to a ratio of areas defined by load-deflection curves at the yielding of steel bars and a final failure. The ductility may also be calculated according to a ratio of products of curvatures and bending moments at the yielding of steel bars and a failure of members. Moreover, for design, when a target bearing capacity is given, it is hard to calculate the ductility of a structure by a simple method and to meet the higher-level requirements of the structure or members on ductility.

Therefore, for the use of hybrid reinforcement, there is currently still a problem how to reasonably arrange areas of steel bars and the FRP bars. When excessive FRP material is used, the problem of excessively low ductility of the structure may occur and the failure process thereof may be extremely rapid. In terms of a series of calculations, the present disclosure can guarantee that the ductility reaches a target value while guaranteeing that the cross-sectional bending bearing capacity reaches a design value, thus guaranteeing the use reliability of a structure and providing a greater potential for the promotion and engineering practical use of the hybrid reinforcement.

SUMMARY

An objective of the present disclosure is to provide an optimization method and system for hybrid FRP and steel bars that can guarantee that the ductility reaches a target value and that the cross-sectional bending bearing capacity reaches a design value, thus guaranteeing the use reliability of a structure.

To achieve the above objective, the present disclosure provides the following technical solutions.

An optimization method for hybrid FRP and steel bars includes:
  obtaining a design value of a bending moment, a target ductility, and basic material parameters;
  determining a cross-sectional bending bearing capacity, a maximum cross-sectional bending bearing capacity, and a minimum cross-sectional bending bearing capacity according to the basic material parameters and the design value of the bending moment;
  determining whether the cross-sectional bending bearing capacity, the maximum cross-sectional bending bearing capacity, and the minimum cross-sectional bending bearing capacity meet a first preset condition;

if yes, determining a maximum steel bar area according to the basic material parameters;

determining a maximum ductility of a steel bar beam;

determining whether the maximum ductility and the target ductility meet a second preset condition;

if yes, determining a minimum steel bar area and a maximum FRP bar area according to the maximum steel bar area;

obtaining a third preset condition; and determining an actual steel bar area and an actual FRP bar area according to the third preset condition, the minimum steel bar area, and the maximum FRP bar area.

Alternatively, the basic material parameters may include: a steel bar yield strength, a steel bar yield strain, a compressive strength of concrete, an ultimate strain of concrete, a tensile strength of FRP, an elasticity modulus of FRP, preset cross-sectional dimension values, a height of a steel bar from atop, a height of FRP from a top, and an equivalent stress rectangle coefficient.

Alternatively, the cross-sectional bending bearing capacity may be calculated by the following formula:

$$\eta_{de} = \frac{M_{de}}{f_c b d^2}$$

where $\eta_{de}$ represents the cross-sectional bending bearing capacity; $M_{de}$ represents the design value of the bending moment; $f_c$ represents the compressive strength of concrete; and b and d represent a width and height in the preset cross-sectional dimension values.

Alternatively, the first preset condition may be as follows:

$$\eta_{min} < \eta_{de} < \eta_{max}$$

where $\eta_{de}$ represents the cross-sectional bending bearing capacity; $\eta_{min}$ represents the minimum cross-sectional bending bearing capacity; and $\eta_{max}$ represents the maximum cross-sectional bending bearing capacity.

Alternatively, the maximum steel bar area may be calculated by the following formula:

$$A_{s,max} = \frac{\alpha_1 b f_c h_1 - \sqrt{\alpha_1 b f_c (\alpha_1 b f_c h_1^2 - 2M_{de})}}{f_y}$$

where $A_{s,max}$ represents the maximum steel bar area; $\alpha_1$ represents a first equivalent stress rectangle coefficient; b represents the width in the preset cross-sectional dimension values; $f_c$ represents the compressive strength of concrete; $h_1$ represents the height of a steel bar from a top; $M_{de}$ represents the design value of the bending moment; and the $f_y$ represents the steel bar yield strength.

Alternatively, the determining a maximum ductility of a steel bar beam may specifically include:

obtaining a double broken line model of hybrid reinforcement with respect to bending moment-curvature;

determining a curvature of a yield point using an energy approach according to the double broken line model;

determining an ultimate curvature according to the maximum steel bar area and the basic material parameters; and determining the maximum ductility according to the curvature of the yield point and the ultimate curvature.

Alternatively, the second preset condition may be as follows:

$$\mu_{max} > \mu_{de}$$

where $\mu_{max}$ represents the maximum ductility, and $\mu_{de}$ represents the target ductility.

Alternatively, determining a minimum steel bar area and a maximum FRP bar area according to the maximum steel bar area may specifically include:

obtaining a preset step size;

gradually reducing a steel bar area and increasing an FRP bar area from the maximum steel bar area according to the preset step size, and determining a current ductility after reducing the steel bar area each time;

calculating an error between the current ductility and the target ductility;

determining whether the error is less than an allowable error; and if no, stopping reducing the steel bar area and increasing the FRP bar area to obtain the minimum steel bar area and the maximum FRP bar area.

An optimization system for hybrid FRP and steel bars includes:

a parameter obtaining module configured to obtain a design value of a bending moment, a target ductility, and basic material parameters;

a cross-sectional bending bearing capacity determination module configured to determine a cross-sectional bending bearing capacity, a maximum cross-sectional bending bearing capacity, and a minimum cross-sectional bending bearing capacity according to the basic material parameters and the design value of the bending moment;

a first determination module configured to determine whether the cross-sectional bending bearing capacity, the maximum cross-sectional bending bearing capacity, and the minimum cross-sectional bending bearing capacity meet a first preset condition;

a maximum steel bar area determination module configured to determine a maximum steel bar area according to the basic material parameters when the cross-sectional bending bearing capacity, the maximum cross-sectional bending bearing capacity, and the minimum cross-sectional bending bearing capacity meet the first preset condition;

a maximum ductility determination module configured to determine a maximum ductility of a steel bar beam;

a second determination module configured to determine whether the maximum ductility and the target ductility meet a second preset condition;

a minimum steel bar area and maximum FRP bar area determination module configured to determine a minimum steel bar area and a maximum FRP bar area according to the maximum steel bar area when the maximum ductility and the target ductility meet the second preset condition;

a preset condition obtaining module configured to obtain a third preset condition; and a hybrid FRP and steel bar module configured to determine an actual steel bar area and an actual FRP bar area according to the third preset condition, the minimum steel bar area, and the maximum FRP bar area.

An electronic device, including a memory and a processor, where the memory is configured to store a computer program, and the processor runs the computer program to cause the electronic device to perform the optimization method for hybrid FRP and steel bars.

According to specific embodiments provided in the present disclosure, the present disclosure has the following technical effects:

In the present disclosure, ductility is defined as a ratio of curvatures at a nominal yield point and in an ultimate state of a member, and the following steps are performed:

1, a designed cross-sectional bending bearing carrying capacity and maximum and minimum cross-sectional bending bearing carrying capacities are calculated and compared;
2, a maximum ductility when pure steel bars are used is calculated and compared with a target design ductility;
3, a steel bar area is adjusted gradually, and the steel bar area and an FRP bar area when an error between an actual ductility and the target ductility is less than an allowable error are obtained; and
4, selectable reinforcement areas are obtained and freely selected according to engineering requirements.

By the above-mentioned general optimization direction and optimization method, in case of given target ductility and target bearing capacity, a target design requirement can be met through trial calculation for a certain of times, and respective reinforcement areas of desired FRP and steel bars are given. Thus, it is guaranteed that a hybrid reinforcement structure has better ductility than an FRP bar reinforced structure and better corrosion resistance than steel bar reinforced structure, meanwhile, the problem of guaranteeing only the structural bearing capacity and failing to guarantee enough ductility using a simple method in hybrid reinforcement is also solved.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

Figure 2:
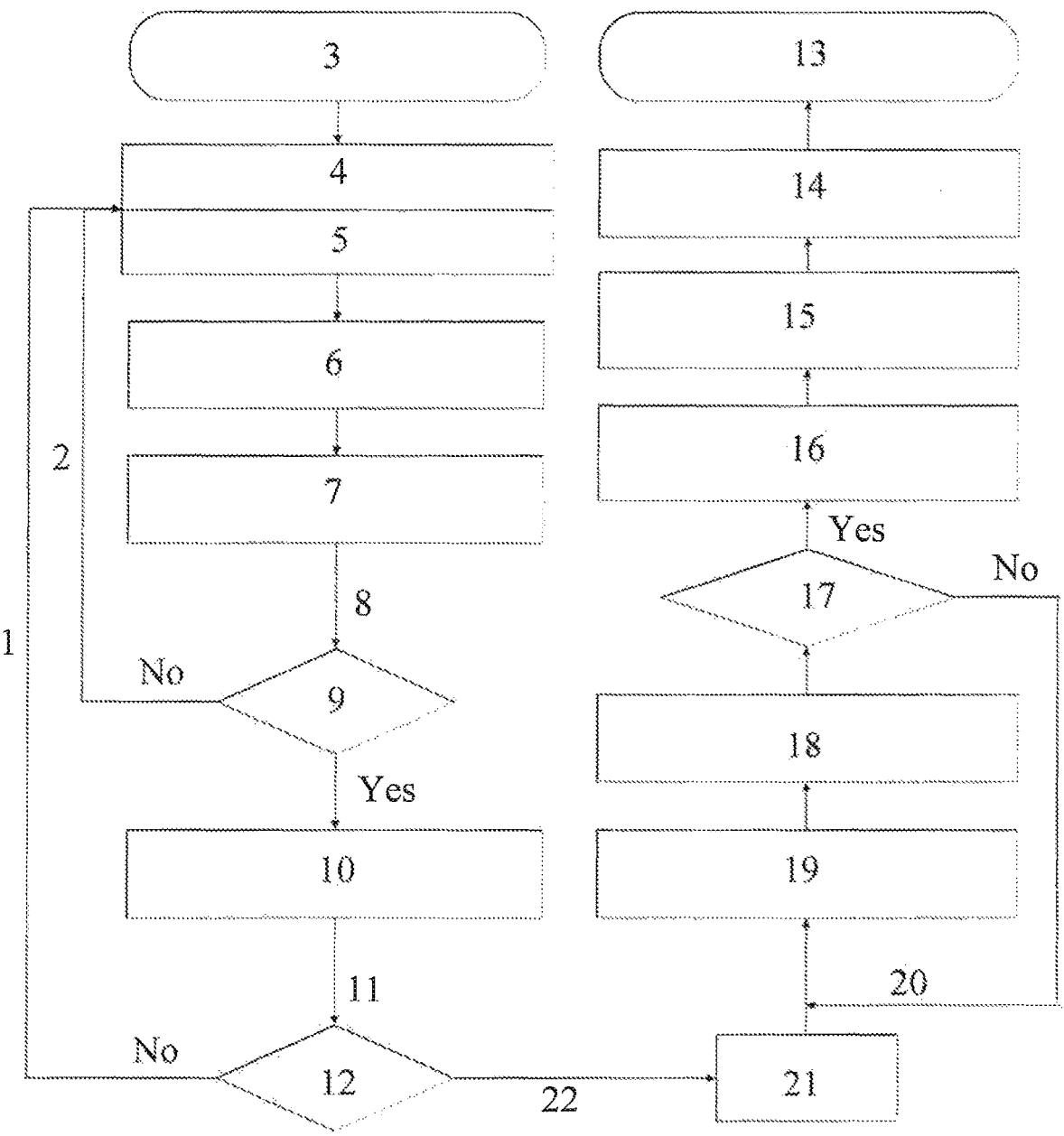
FIG. 2 is a specific flow block diagram of an optimization method for hybrid FRP and steel bars according to the present disclosure.

Reference numerals in FIG. 2:

1—Adjust the cross-sectional dimensions b and d or adjust the material parameter $f_c$
2—Adjust the cross-sectional dimensions b and d or adjust the material parameter $f_c$
3—Give target design value $M_{de}$ and target design ductility $\mu_{de}$ according to engineering requirements
4—Obtain material parameters $f_y$, $f_{fu}$, $E_f$, and $f_c$ according to a type of a material to be used
5—Provisional cross-sectional dimensions: width b and height d
6—Calculate a designed cross-sectional bending bearing carrying capacity $\eta_{de}=M_{de}/f_c bd^2$
7—Calculate maximum and minimum cross-sectional bending bearing carrying capacities $\eta_{max}$, $\eta_{min}$
8—Determine whether a size of a cross section is appropriate by determining whether the designed cross-sectional bending bearing carrying capacity is between the maximum and the minimum
9—Determine whether $\eta_{min}<\eta_{de}<\eta_{max}$
10—Select $A_s=A_{s,max}$, and calculate the maximum ductility $\mu_{max}$
11—Determine whether the size of the cross section is appropriate by determining whether the maximum cross-sectional ductility $\mu_{max}$ is greater than the design ductility $\mu_{de}$
12—Determine whether $\mu_{s,max}>\mu_{de}$
13—Complete the design flow and guarantee that both of the bending moment and the ductility meet the design value requirements
14—Select $A_s$ and $A_f$ according to actual engineering situations
15—Obtain a selectable range of steel bars: $A_{s,min} \leq A_s \leq A_{s,max}$
Obtain a selectable range of FRP bars: $0 \leq A_f \leq A_{s,max}$
16—Obtain the minimum reinforcement area $A_{s,min}$ of steel bars and the maximum reinforcement area $A_{f,max}$ of FRP in corresponding situation
17—Determine whether $$\left|\frac{\mu_0 - \mu_{de}}{\mu_0}\right| \leq e$$

18—Calculate $\varphi_{y,e}$ and the ductility coefficient $\mu_0$ at this time
19—Calculate $A_f$ when $M_u=M_{de}$ according to the formula
20—If $\mu_0<\mu_{de}$, increase $A_s$;
If $\mu_0>\mu_{de}$, reduce $A_s$;
21—Select $A_s$ to be slightly less than $A_{s,max}$
22—Yes, obtain the selection range of $A_s$ as $A_s \leq A_{s,max}$

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide an optimization method and system for hybrid FRP and steel bars that can guarantee that the ductility reaches a target value while guaranteeing that the cross-sectional bending bearing capacity reaches a design value, thus guaranteeing the use reliability of a structure.

In order to make the above objective, features and advantages of the present disclosure clearer and more comprehensible, the present disclosure will be further described in detail below in combination with accompanying drawings and particular implementation modes.

Figure 1:
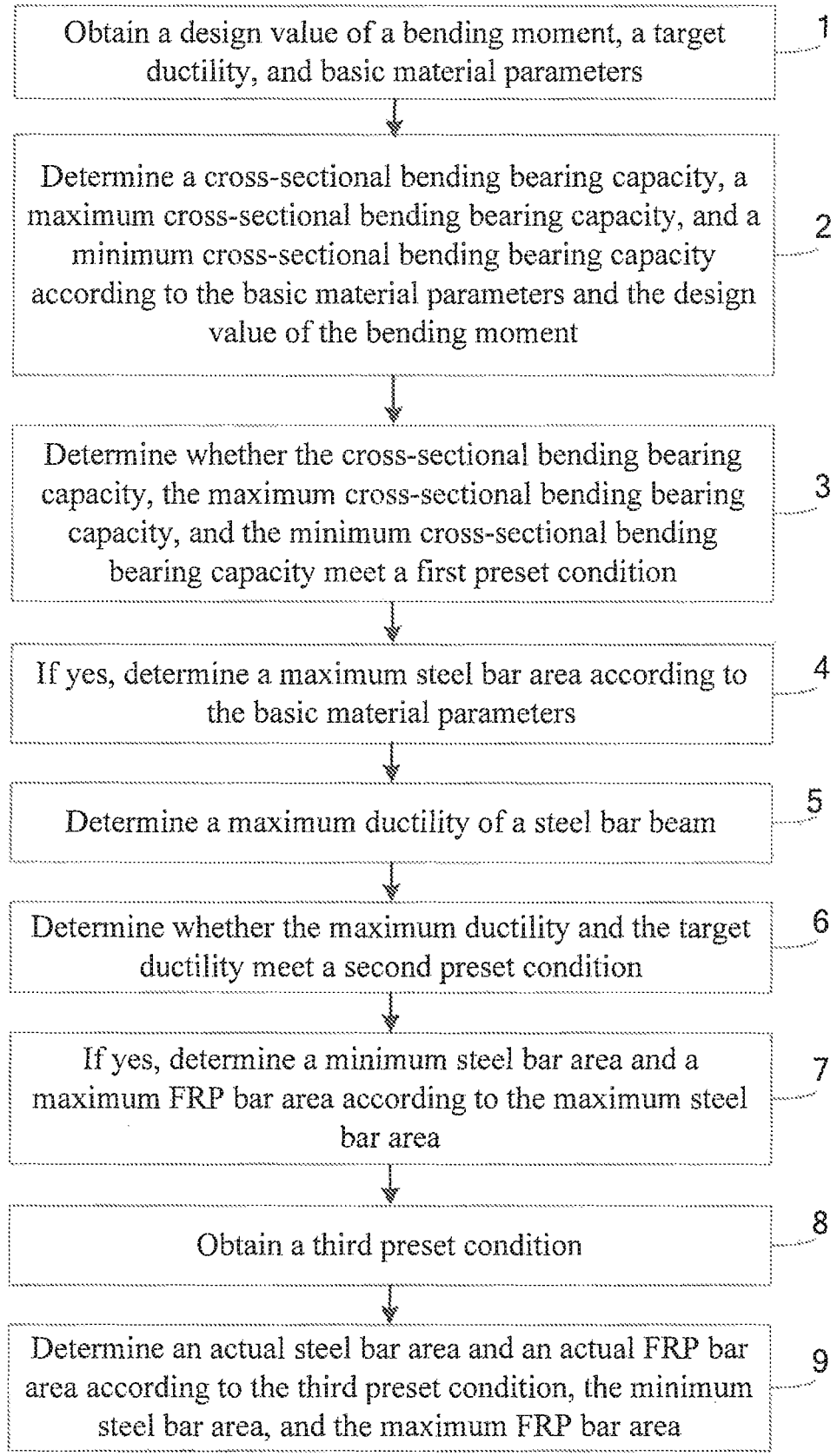
FIG. 1 is a flowchart of an optimization method for hybrid FRP and steel bars according to the present disclosure.

As shown in FIG. 1 and FIG. 2, an optimization method and system for hybrid FRP and steel bars includes the following steps.

Step 1: a design value of a bending moment, a target ductility, and basic material parameters are obtained.

Step 2: a cross-sectional bending bearing capacity, a maximum cross-sectional bending bearing capacity, and a minimum cross-sectional bending bearing capacity are determined according to the basic material parameters and the design value of the bending moment.

Specifically, the cross-sectional bending bearing capacity $\eta_{de}$ and the maximum and minimum cross-sectional bending bearing capacity $\eta_{max}$ and $\eta_{min}$ are determined according to the basic material parameters and the design value of the bending moment $M_{de}$ as well as the target ductility $\mu_{de}$.

The basic material parameters include: steel bar yield strength $f_y$, steel bar yield strain $\varepsilon_y$, concrete compressive strength $f_c$, concrete ultimate strain $\varepsilon_{cu}$, FRP tensile strength $f_{fu}$, FRP ultimate strain $\varepsilon_{fu}$, FRP elasticity modulus $E_f$, provisional cross-sectional design dimensions (preset cross-sectional dimension values) b·d, height $h_1$ of a steel bar from a top, height $h_2$ of FRP from a top, and an equivalent stress rectangle coefficient, where the equivalent stress rectangle coefficient includes a first equivalent stress rectangle coefficient a1 and a second equivalent stress rectangle coefficient $\beta_1$, and $\alpha_1$ and $\beta_1$ are both 0.85.

Regarding the provisional cross-sectional design dimensions, the height and width of a beam may be estimated roughly according to the span of the beam at the very beginning of structural design, but calculation verification needs to be performed later.

The cross-sectional bending bearing capacity $\mu_{de}$ is calculated by the following formula:

$$\eta_{de} = \frac{M_{de}}{f_c b d^2} \qquad (1)$$

Whether the given target bending moment design value and cross-sectional size are appropriate is determined with the cross-sectional bending bearing capacities, where the maximum ($\eta_{max}$) and minimum ($\eta_{min}$) bending bearing capacity calculated for a specified cross-section may be calculated by Formulas (2) and (3).

$$\eta_{min} = \frac{M_{u,min}}{f_c b d^2} = \frac{0.85\beta_1\varepsilon_{cu}}{\varepsilon_{cu}+\varepsilon_{fu}}\left(1 - \frac{\beta_1\varepsilon_{cu}}{2(\varepsilon_{cu}+\varepsilon_{fu})}\right) \qquad (2)$$

$$\eta_{max} = \frac{M_{u,max}}{f_c b d^2} = \frac{0.85\beta_1\varepsilon_{cu}}{\varepsilon_{cu}+\varepsilon_y}\left(1 - \frac{\beta_1\varepsilon_{cu}}{2(\varepsilon_{cu}+\varepsilon_y)}\right) \qquad (3)$$

Step 3, whether the cross-sectional bending bearing capacity, the maximum cross-sectional bending bearing capacity, and the minimum cross-sectional bending bearing capacity meet a first preset condition is determined.

Step 4, If yes, a maximum steel bar area is determined according to the basic material parameters.

According to the three parameters obtained in step 2, $\eta_{de}$, $\eta_{max}$, and $\eta_{min}$ are compared to further determine whether the provisional cross-sectional dimensions and the cross-sectional bending bearing capacity $\eta_{de}$ meet bending bearing capacity requirements.

When the calculated $\eta_{de}$ meets $\eta_{min} < \eta_{de} < \eta_{max}$, the cross-section is capable of bearing the designed bending moment value in case of no over-reinforcement failure or FRP breakage occurring. At this time, original parameter materials and preset cross-sectional dimensions may bear the target design bending moment. At this time, the maximum steel bar area $A_{smax}$ of steel bars may be obtained according to the basic material parameters.

If $\eta_{de} < \eta_{min}$, it indicates that the cross-section is excessively large. When the design bending moment is reached, only a few bars are needed, and the failure mode at this time is FRP rupture. Since the FRP breakage belongs to sudden failure, which is a failure mode needing to be avoided in design, both the height and the width may be reduced or the strength of the used concrete may be reduced while a height-width ratio of the cross-section is guaranteed.

If $\eta_{max} < \eta_{de}$, it indicates that the cross-section is excessively small at this time, and excessive bars are needed to reach the design bending moment. At this time, concrete is crushed when the arranged steel bars do not yield so that the steel bars cannot be fully utilized. Therefore, the height and the width may be increased approximately or the strength of the used concrete may be increased while the height-width ratio of the cross section is maintained.

Step 5: a maximum ductility of a steel bar beam is determined.

According to the above steps, it may be known that the preset cross-sectional dimensions meet the bending bearing capacity requirement, but it is unclear whether the preset cross-sectional dimensions meet the ductility requirement. Therefore, the maximum ductility needs to be calculated to determine whether the preset cross-sectional dimensions can meet the ductility requirement at the same time.

Figure 3:
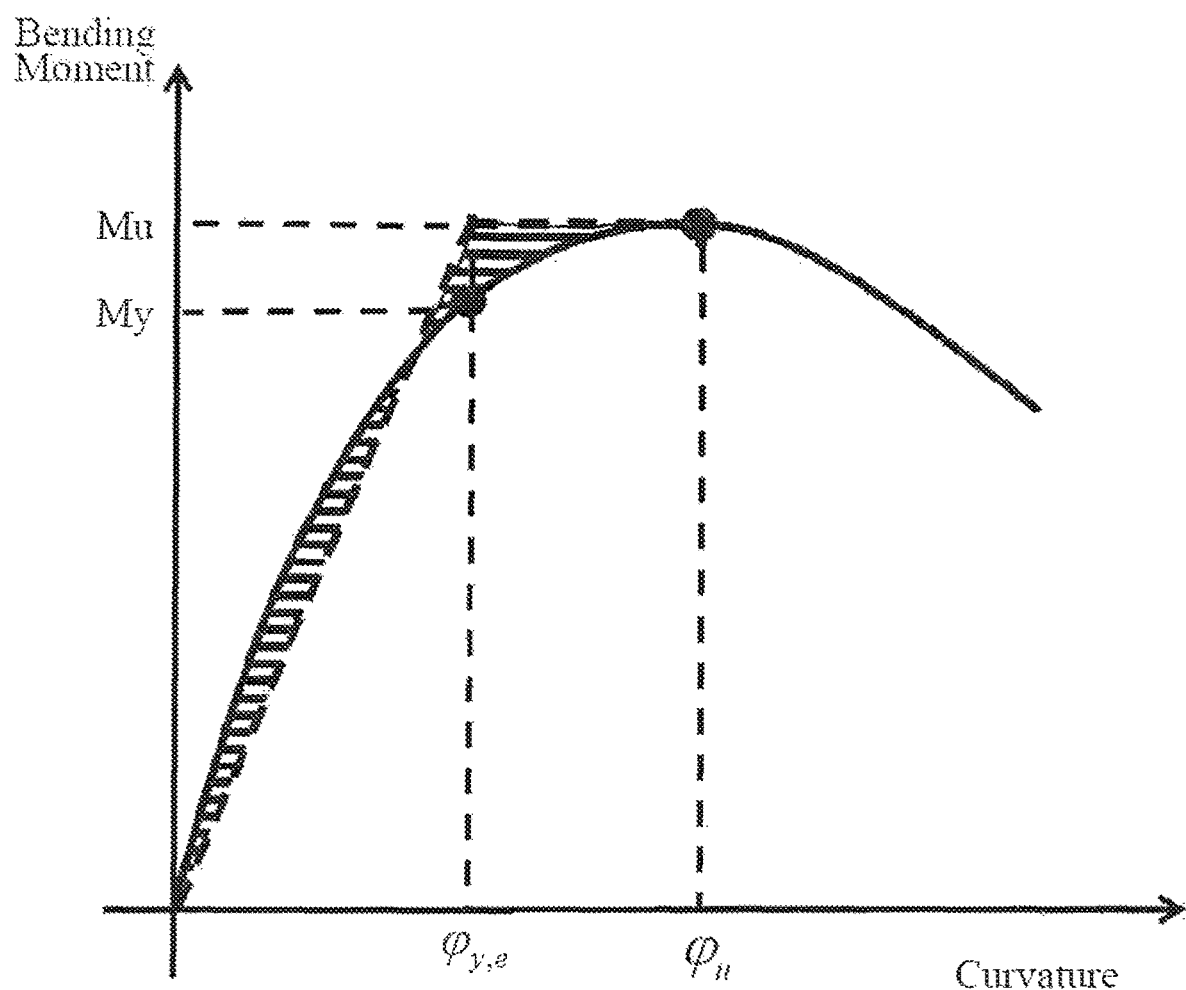
FIG. 3 is a schematic diagram of solving a nominal yield point using an energy approach according to the present disclosure.

The ductility is defined in a common way used in concrete structures, i.e., a ratio of a curvature in an ultimate state and a curvature at a yield point, which is specifically as shown in Formula (4), where the yield point is replaced by a nominal yield point obtained using the energy approach. The schematic diagram of solving is shown in FIG. 3.

$$\mu = \frac{\varphi_u}{\varphi_{y,e}} \qquad (4)$$

Where $\varphi_u$ represents an ultimate curvature and $\varphi_{y,e}$ represents the yield point obtained by the energy approach.

Figure 4:
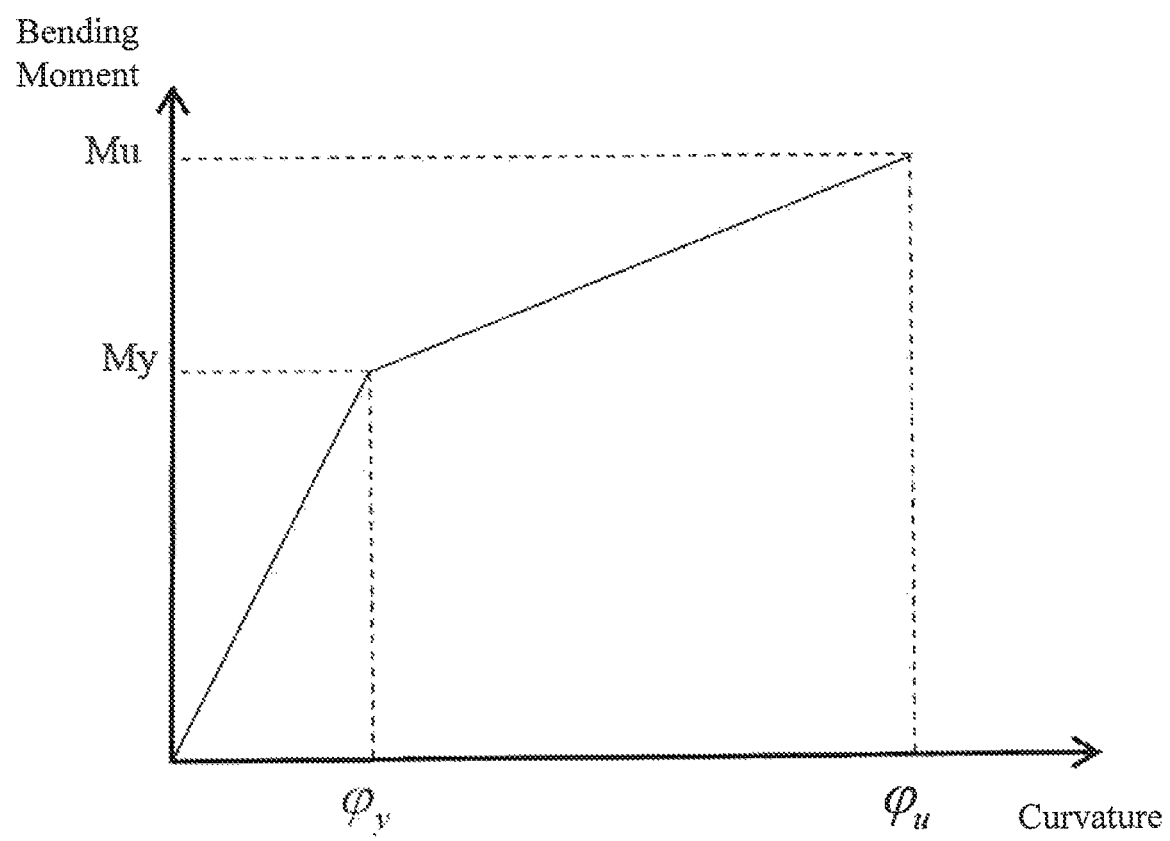
FIG. 4 is a schematic diagram of a double broken line model of hybrid reinforcement with respect to bending moment-curvature according to the present disclosure.

If a bending moment-curvature curve of a hybrid reinforcement ratio is simplified into a double-linear model, as shown in FIG. 4, an area defined by the bending moment-curvature curve may be obtained by the following formula:

$$S = \frac{M_y\varphi_y}{2} + \frac{(M_y + M_u)(\varphi_u - \varphi_y)}{2} \qquad (5)$$

The curvature of the nominal yield point may be obtained as $\varphi_{y,e}$ according to the definition of the yield point obtained by the energy approach by the following formula:

$$\varphi_{y,e} = 2\varphi_u - \frac{S}{M_u} \qquad (6)$$

At this time, the ultimate curvature $\varphi_u$ and the curvature $\varphi_{y,e}$ of the nominal yield point calculated by Formula (6) are substituted into Formula (4) to obtain the ductility of the beam at this time.

The foregoing are the descriptions of the concepts, and the actual calculation process is described below.

When the pure steel bar beam is used, the use amount $A_{s,max}$ needed to reach the design bending moment (the ductility is maximum when the concrete beam is the pure steel bar beam) is specifically calculated by Formula (7) (which may be obtained according to initial material parameters).

$$A_{s,max} = \frac{\alpha_1 b f_c h_1 - \sqrt{\alpha_1 b f_c (\alpha_1 b f_c h_1^2 - 2M_{de})}}{f_y} \quad (7)$$

The maximum ductility $\mu_{max}$ is obtained when the bars for the concrete beam are all steel bars, the curvature $\varphi_y$ when the steel bar yield, and the curvature $\varphi_u$ in the ultimate state may be calculated according to Formulas (8) to (10).

$$x_c = \frac{\sqrt{(A_s f_y + \alpha_1 \beta_1 f_c b h_1)^2 - 4\alpha_1 \beta_1 f_c b A_s f_y h_1} + (A_s f_y + \alpha_1 \beta_1 f_c b h_1)}{2\alpha_1 \beta_1 f_c b} \quad (8)$$

$$\varphi_y = \frac{\varepsilon_y}{h_1 - x_c} \quad (9)$$

$$\varphi_u = \frac{\varepsilon_{cu}}{x_c} \quad (10)$$

In Formula (8), $A_s = A_{s,max}$.

For the pure steel bar beam, when its reinforcement effect is not considered, for $M_u = M_y = M_{de}$, the nominal yield point $\varphi_{y,e}$ obtained by the energy approach may be calculated using Formulas (5) and (6). The results of Formulas (6) and (10) are substituted into Formula (4) to calculate $\mu_{max}$.

Step 6: whether the maximum ductility and the target ductility meet a second preset condition is determined.

Step 7: if yes, a minimum steel bar area and a maximum FRP bar area are determined according to the maximum steel bar area.

At this step, it may be known whether the size of the cross-section is appropriate by comparing the maximum ductility with the designed target ductility. The subsequent steps can be carried out only after it is proven that the cross-sectional dimensions meet requirements in terms of bearing capacity and ductility. Otherwise, no matter what areas of the steel bars and the FRP are, the ductility cannot meet the design target.

Specifically, the $\mu_{max}$ obtained above is compared with the target ductility $\mu_{de}$ given in the design to determine whether the preset cross-sectional dimensions meet the ductility and determine whether the calculated maximum ductility meets the target ductility.

If $\mu_{max}$ is greater than $\mu_{de}$ at this time, it indicates that the cross-sectional dimensions are appropriate. The next step of design may be carried out and for the area of the steel bar reinforcement, $A_s < A_{s,max}$.

If $\mu_{max}$ is less than $\mu_{de}$ $\mu_{de}$, it indicates that the cross-section is excessively small, and even the pure steel bar beam cannot meet the ductility requirement. At this time, the height and the width may be increased approximately or the strength of the used concrete may be increased while the height-width ratio of the cross section is maintained. The calculation is then performed again from step 2.

Step 8: a third preset condition is obtained.

Step 9: an actual steel bar area and an actual FRP bar area are determined according to the third preset condition, the minimum steel bar area, and the maximum FRP bar area.

According to step 6 and step 7, it may be known that the cross-sectional dimensions meet the ductility design requirement. Therefore, the steel bar area may be gradually reduced and the FRP bar area may be increased such that the error between the corresponding ductility p-o and the target ductility is less than the allowable error (which is an engineering error here), thereby obtaining $A_{s,min}$ and $A_{f,max}$ (when the steel bar area is reduced, the FRP bar area needs to be increased so that the bending bearing capacity can remain unchanged; at this time, the ductility will decrease, and when the ductility decreases to the target ductility, reducing the steel bar area should be stopped).

By determination through step 3 and step 4, it may be known that $M = M_{de}$ can be obtained for the current cross-section; and by determination through step 6 and step 7, it may be known that $\mu_0 = \mu_{de}$ can be obtained for the current cross-section. Next, the steel bar area and the FRP bar area when the actual ductility $\mu_0$ is just equal to the target ductility should be solved. After $A_{s,max}$ is obtained by calculation, the above objective can be achieved by gradually reducing the steel bars reinforcement area and gradually increasing the FRP bar area.

I. When the steel bars reinforcement area decreases from $A_{s,max}$ to $A_s$, a height of a compressive zone at this time may be obtained by the solving formula (11), and the FRP bar area $A_f$ corresponding to the new steel bar area $A_s$ may be solved by Formula (12).

$$x'_c = \frac{\alpha_1 \beta_1 f_c b h_1 - \sqrt{\alpha_1 \beta_1^2 f_c b (2A_s f_y (h_2 - h_1) + \alpha_1 f_c b h_1^2 - 2M_u)}}{\alpha_1 \beta_1^2 f_c b} \quad (11)$$

$$A_f = \frac{\alpha_1 \beta_1 f_c b x'_c - A_s f_y}{\frac{h_2 - x'_c}{x'_c} \varepsilon_{cu} E_f} \quad (12)$$

At this time, since two types of reinforcement are used, the curvature $\varphi_y$ and the bending moment $M_f$ when the steel bar yield and the curvature $\varphi_u$ and the bending moment $M_u$ in the ultimate state are different from those of the pure steel bar beam and the pure FRP beam. Specific calculation formulas are as follows:

When the steel bar yield ($\varphi_y$ and $M_y$ are calculated):

$$x_c = \frac{\sqrt{(A_s f_y + A_f E_f \varepsilon_y + \alpha_1 \beta_1 f_c b h_1)^2 - 4\alpha_1 \beta_1 f_c b (A_s f_y h_1 + A_f E_f \varepsilon_y h_2)} + (A_s f_y + A_f E_f \varepsilon_y + \alpha_1 \beta_1 f_c b h_1)}{2\alpha_1 \beta_1 f_c b} \quad (13)$$

The curvature at this time is as follows:

$$\varphi_y = \frac{\varepsilon_y}{h_1 - x_c} \quad (14)$$

The bearing capacity at this time is as follows:

$$M_y = A_s f_y (h_1 - 0.5\beta_1 x_c) + A_f E_f \varepsilon_f (h_2 - 0.5\beta_1 x_c) \quad (15)$$

where $\varepsilon_f = \frac{h_2 - x_c}{x_c} \varepsilon_{cu}$.

In the ultimate state ($\varphi_u$ and $M_u$ are calculated):
If FRP is not broken, the concrete is crushed (an ideal failure mode).

$$x_c = \frac{\sqrt{(A_f\varepsilon_{cu}E_f - A_sf_y)^2 + 4\alpha_1\beta_1f_cbA_f\varepsilon_{cu}E_fh_2} - (A_f\varepsilon_{cu}E_f - A_sf_y)}{2\alpha_1\beta_1f_cb} \quad (16)$$

The curvature at this time is as follows:

$$\varphi_u = \frac{\varepsilon_{cu}}{x'_c} = \frac{\varepsilon_f}{h_2 - x'_c} \quad (17)$$

The bearing capacity is as follows:

$$M_u = A_sf_y(h_1 - 0.5\beta_1 x'_c) + A_fE_f\varepsilon_f(h_2 - 0.5\beta_1 x'_c) \quad (18)$$

$$\text{where } \varepsilon_f = \frac{h_2 - x'_c}{x'_c}\varepsilon_{cu}.$$

The parameters in Formula (13) to Formula (18) are known, and the formulas may be solved in sequence. After being obtained, the curvature $\varphi_y$ and the bending moment $M_y$ when the steel bar yield and the curvature $\varphi_u$ and the bending moment $M_u$ in the ultimate state are substituted into Formulas (5) and (6) to obtain the curvature $\varphi_{y,e}$ of the nominal yield point, and a ductility coefficient $\mu_0$ at this time is obtained according to Formula (4).

II. An error between the ductility coefficient $\mu_0$ at this time and a target ductility coefficient $\mu_{de}$ at this time may be calculated by $$\left|\frac{\mu_0 - \mu_{de}}{\mu_0}\right|.$$

When $$\left|\frac{\mu_0 - \mu_{de}}{\mu_0}\right|$$

is less than the allowable error e, it may be approximated at this time that the steel bar area and the FRP bar area meet the bearing capacity target and the ductility target at the same time, and therefore, the trial calculation can be terminated.

The above steps may be carried out by fully utilizing calculation tools such as Excel. Generally, the target ductility with an error of less than 5% (an engineering error is usually 5%) can be obtained by performing trial calculation for less than 5 times.

The steel bar area $A_s$ and the corresponding FRP bar area $A_f$ at this time are denoted as $A_{s,min}$ and $A_{f,max}$ $A_{f,max}$
If $$\left|\frac{\mu_0 - \mu_{de}}{\mu_0}\right|$$

is greater than the allowable error e, the steel beam area As should be continuously adjusted (the specific adjustment direction is: if $\mu_0 > \mu_{de}$, the steel bar area should be reduced), and calculation is continued from Formulas 13 to 18, and results are substituted into Formulas 5 and 6 to obtain the curvature $\varphi_{y,e}$ of the nominal yield point. The ductility coefficient $\mu_0$ at this time is obtained according to Formula 4 until $$\left|\frac{\mu_0 - \mu_{de}}{\mu_0}\right|$$

is less than the allowable error e.

The selectable area ranges of the steel bars and the FRP bars may be determined according to $A_{s,max}$ obtained in step 4 and $A_{s,min}$ and Amax obtained in step 7, and the actual steel bar area $A_s$ and FRP bar area $A_f$ can be selected according to actual situations (such as existing materials have only fixed specifications) and the selectable area ranges.

In the case of meeting the bearing capacity and ductility design target values, it can be obtained according to the above calculation that the selectable area of the steel bars is $A_{s,min} \leq A_s \leq A_{s,max}$ and the selectable area of the FRP bars is $0 \leq A_f \leq A_{f,max}$.

According to actual engineering requirements, it can be guaranteed that $M_u \geq M_{de}$ and $\mu_0 \geq \mu_{de}$ (i.e., greater than or equal to the bearing capacity design target and the ductility design target at the same time) as long as the area of the steel bars is selected as $A_{s,min} \leq A_s \leq A_{s,max}$ and the FRP bar area is selected as $0 \leq A_f \leq A_{f,max}$.

If it only needs to guarantee $M_u = M_{de}$ and $\mu_0 = \mu_{de}$,
it may be selected that $A_s = A_{s,min}$, and $A_f$ should be $A_f$ $A_{f,max}$.

it is selected that $A_{s,min} \leq A_s \leq A_{s,max}$, and the corresponding $A_f$ ($0 \leq A_f \leq A_{f,max}$ at this time) is obtained according to Formulas (11) and (12).

Based on the above method, the present disclosure further provides an optimization system for hybrid FRP and steel bars, including:

a parameter obtaining module configured to obtain a design value of a bending moment, a target ductility, and basic material parameters;

a cross-sectional bending bearing capacity determination module configured to determine a cross-sectional bending bearing capacity, a maximum cross-sectional bending bearing capacity, and a minimum cross-sectional bending bearing capacity according to the basic material parameters and the design value of the bending moment;

a first determination module configured to determine whether the cross-sectional bending bearing capacity, the maximum cross-sectional bending bearing capacity, and the minimum cross-sectional bending bearing capacity meet a first preset condition;

a maximum steel bar area determination module configured to determine a maximum steel bar area according to the basic material parameters when the cross-sectional bending bearing capacity, the maximum cross-sectional bending bearing capacity, and the minimum cross-sectional bending bearing capacity meet the first preset condition;

a maximum ductility determination module configured to determine a maximum ductility of a steel bar beam;

a second determination module configured to determine whether the maximum ductility and the target ductility meet a second preset condition;

a minimum steel bar area and maximum FRP bar area determination module configured to determine a minimum steel bar area and a maximum FRP bar area according to the maximum steel bar area when the maximum ductility and the target ductility meet the second preset condition;

a preset condition obtaining module configured to obtain a third preset condition; and a hybrid FRP and steel bar module configured to determine an actual steel bar area and an actual FRP bar area according to the third preset condition, the minimum steel bar area, and the maximum FRP bar area.

The present disclosure also has the following technical effects:

In structural design, bearing capacity design is the most basic requirement, and ductility is a higher requirement. It is complicated to find a method capable of meeting the ductility and bearing capacity requirements at the same time. The present disclosure is mainly to find a proportion range of steel bars and FRP bars that meets the ductility and the bearing capacity in a simple way, and the bending moment and the ductility can be greater than or equal to the design values by selection from this range. In this selectable range, a ratio of two bars may be set freely.

The embodiments are described herein in a progressive manner. Each embodiment focuses on the difference from another embodiment, and the same and similar parts between the embodiments may refer to each other. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the contents of the present description shall not be construed as limitations to the present disclosure.

What is claimed is:

1. An optimization method for preparing a concrete structure, comprising:

obtaining a design value of a bending moment, a target ductility, and basic material parameters;

determining a cross-sectional bending bearing capacity, a maximum cross-sectional bending bearing capacity, and a minimum cross-sectional bending bearing capacity according to the basic material parameters and the design value of the bending moment;

determining whether the cross-sectional bending bearing capacity, the maximum cross-sectional bending bearing capacity, and the minimum cross-sectional bending bearing capacity meet a first preset condition, wherein the first preset condition is as follows:

$$\eta_{min} < \eta_{de} < \eta_{max}$$

wherein $\eta_{de}$ represents the cross-sectional bending bearing capacity; $\eta_{min}$ represents the minimum cross-sectional bending bearing capacity; and $\eta_{max}$ represents the maximum cross-sectional bending bearing capacity if yes, determining a maximum steel bar area according to the basic material parameters, wherein the maximum steel bar area is calculated by the following formula:

$$A_{s,max} = \frac{\alpha_1 bf_c h_1 - \sqrt{\alpha_1 bf_c(\alpha_1 bf_c h_1^2 - 2M_{de})}}{f_y}$$

wherein $A_{s,max}$ represents the maximum steel bar area; $\alpha_1$ represents a first equivalent stress rectangle coefficient; b represents a width in preset cross-sectional dimension values; $f_c$ represents a compressive strength of concrete; $h_1$ represents a height of a steel bar from a top; $M_{de}$ represents the design value of the bending moment; and the $f_y$ represents a steel bar yield strength;

determining a maximum ductility of a steel bar beam;

determining whether the maximum ductility and the target ductility meet a second preset condition; wherein the second preset condition is as follows:

$$\mu_{max} > \mu_{de}$$

wherein $\mu_{max}$ represents the maximum ductility, and $\mu_{de}$ represents the target ductility if yes, determining a minimum steel bar area and a maximum FRP bar area according to the maximum steel bar area;

obtaining a third preset condition;

determining an actual steel bar area and an actual FRP bar area according to the third preset condition, the minimum steel bar area, and the maximum FRP bar area; and preparing the concrete structure according to the actual steel bar area and the actual FRP bar area, wherein the determining a cross-sectional bending bearing capacity, a maximum cross-sectional bending bearing capacity, and a minimum cross-sectional bending bearing capacity according to the basic material parameters and the design value of the bending moment specifically comprises:

calculating the cross-sectional bending bearing capacity $\eta_{de}$ and the maximum and minimum cross-sectional bending bearing capacities $\eta_{max}$ and $\eta_{min}$ according to the basic material parameters and the design value of the bending moment $M_{de}$, wherein the cross-sectional bending bearing capacity $\eta_{de}$ is calculated by the following formula:

$$\eta_{de} = \frac{M_{de}}{f_c bd^2},$$

wherein d represents a height in the preset cross-sectional dimension values, wherein maximum and minimum bending bearing capacities for a specified cross section are calculated by the following formulas:

$$\eta_{min} = \frac{M_{u,min}}{f_c bd^2} = \frac{0.85 \ \beta_1 \varepsilon_{cu}}{\varepsilon_{cu} + \varepsilon_{fu}} \left(1 - \frac{\beta_1 \varepsilon_{cu}}{2(\varepsilon_{cu} + \varepsilon_{fu})}\right),$$

$$\eta_{max} = \frac{M_{u,max}}{f_c bd^2} = \frac{0.85 \ \beta_1 \varepsilon_{cu}}{\varepsilon_{cu} + \varepsilon_y} \left(1 - \frac{\beta_1 \varepsilon_{cu}}{2(\varepsilon_{cu} + \varepsilon_y)}\right),$$

wherein $\beta_1$ represents a second stress rectangle coefficient; $\varepsilon_{cu}$ represents an ultimate strain of concrete; $\varepsilon_{fu}$ represents an ultimate strain of FRP; and $\varepsilon_y$ represents a steel bar yield strain;

the determining a minimum steel bar area and a maximum FRP bar area according to the maximum steel bar area specifically comprises:

obtaining a preset step size;

gradually reducing a steel bar area and increasing an FRP bar area from the maximum steel bar area according to the preset step size, and determining a current ductility after reducing the steel bar area each time;

calculating an error between the current ductility and the target ductility;

determining whether the error is less than an allowable error; and if no, stopping reducing the steel bar area and increasing the FRP bar area to obtain the minimum steel bar area and the maximum FRP bar area; and the determining an actual steel bar area and an actual FRP bar area according to the third preset condition, the minimum steel bar area, and the maximum FRP bar area specifically comprises:

determining a steel bar selection range as $A_{s,min} \leq A_s \leq A_{s,max}$ and an FRP bar selection range as $0 \leq A_f \leq A_{f,max}$ when the carrying capacity and the target ductility are met; and according to actual engineering requirements, selecting a steel bar area $A_{s,min} \leq A_s \leq A_{s,max}$ and an FRP bar area $0 \leq A_f \leq A_{f,max}$, and guaranteeing $M_u \geq M_{de}$ and $\mu_0 \geq \mu_{de}$, wherein $A_s$ represents the actual steel bar area; $A_f$ represents the actual FRP bar area; $A_{s,min}$ represents the minimum steel bar area; $A_{f,max}$ represents the maximum FRP bar area; $M_u$ represents a bending moment in an ultimate state; and $\mu_0$ represents an actual ductility.

2. The optimization method according to claim 1, wherein the basic material parameters comprise: a steel bar yield strength, a steel bar yield strain, a compressive strength of concrete, an ultimate strain of concrete, a tensile strength of FRP, an ultimate strain of the FRP, an elasticity modulus of the FRP, the preset cross-sectional dimension values, a height of a steel bar from a top, a height of the FRP from a top, and an equivalent stress rectangle coefficient.

3. The optimization method according to claim 1, wherein the determining a maximum ductility of a steel bar beam specifically comprises:

obtaining a double broken line model of hybrid reinforcement with respect to bending moment-curvature;

determining a curvature of a yield point using an energy approach according to the double broken line model;

determining an ultimate curvature according to the maximum steel bar area and the basic material parameters; and determining the maximum ductility according to the curvature of the yield point and the ultimate curvature.

4. An electronic device, comprising a memory and a processor, wherein the memory is configured to store a non-transitory computer program, and the processor runs the non-transitory computer program to cause the electronic device to perform the method according to claim 1.

5. An electronic device, comprising a memory and a processor, wherein the memory is configured to store a non-transitory computer program, and the processor runs the non-transitory computer program to cause the electronic device to perform the method according to claim 2.

6. An electronic device, comprising a memory and a processor, wherein the memory is configured to store a non-transitory computer program, and the processor runs the non-transitory computer program to cause the electronic device to perform the method according to claim 3.

7. An optimization system for preparing a concrete structure, comprising:

a parameter obtaining module configured to obtain a design value of a bending moment, a target ductility, and basic material parameters;

a cross-sectional bending bearing capacity determination module configured to determine a cross-sectional bending bearing capacity, a maximum cross-sectional bending bearing capacity, and a minimum cross-sectional bending bearing capacity according to the basic material parameters and the design value of the bending moment;

a first determination module configured to determine whether the cross-sectional bending bearing capacity, the maximum cross-sectional bending bearing capacity, and the minimum cross-sectional bending bearing capacity meet a first preset condition, wherein the first preset condition is as follows:

$$\eta_{min} < \eta_{de} < \eta_{max}$$

wherein $\eta_{de}$ represents the cross-sectional bending bearing capacity; $\eta_{min}$ represents the minimum cross-sectional bending bearing capacity; and $\eta_{max}$ represents the maximum cross-sectional bending bearing capacity;

a maximum steel bar area determination module configured to determine a maximum steel bar area according to the basic material parameters when the cross-sectional bending bearing capacity, the maximum cross-sectional bending bearing capacity, and the minimum cross-sectional bending bearing capacity meet the first preset condition, wherein the maximum steel bar area is calculated by the following formula:

$$A_{s,max} = \frac{\alpha_1 bf_c h_1 - \sqrt{\alpha_1 bf_c (\alpha_1 bf_c h_1^2 - 2M_{de})}}{f_y}$$

wherein $A_{s,max}$ represents the maximum steel bar area; di represents a first equivalent stress rectangle coefficient; b represents a width in preset cross-sectional dimension values; $f_c$ represents the compressive strength of concrete; $h_1$ represents the height of a steel bar from a top; $M_{de}$ represents the design value of the bending moment; and the $f_y$ represents the steel bar yield strength;

a maximum ductility determination module configured to determine a maximum ductility of a steel bar beam;

a second determination module configured to determine whether the maximum ductility and the target ductility meet a second preset condition, wherein the second preset condition is as follows:

$$\mu_{max} > \mu_{de}$$

wherein $\mu_{max}$ represents the maximum ductility, and $\mu_{de}$ represents the target ductility;

a minimum steel bar area and maximum FRP bar area determination module configured to determine a minimum steel bar area and a maximum FRP bar area according to the maximum steel bar area when the maximum ductility and the target ductility meet the second preset condition;

a preset condition obtaining module configured to obtain a third preset condition;

a hybrid FRP and steel bar module configured to determine an actual steel bar area and an actual FRP bar area according to the third preset condition, the minimum steel bar area, and the maximum FRP bar area, and prepare the concrete structure according to the actual steel bar area and the actual FRP bar area;

wherein a process of determining the cross-sectional bending bearing capacity, the maximum cross-sectional bending bearing capacity, and the minimum cross-sectional bending bearing capacity according to the basic material parameters and the design value of the bending moment specifically comprises:

calculating the cross-sectional bending bearing capacity $\eta_{de}$ and the maximum and minimum cross-sectional bending bearing capacities $\eta_{max}$ and $\eta_{min}$ according to the basic material parameters and the design value of the bending moment $M_{de}$, wherein the cross-sectional bending bearing capacity $\eta_{de}$ is calculated by the following formula:

$$\eta_{de} = \frac{M_{de}}{f_c bd^2},$$

wherein d represents a height in the preset cross-sectional dimension values, wherein maximum and minimum bending bearing capacities for a specified cross section are calculated by the following formulas:

$$\eta_{min} = \frac{M_{u,min}}{f_c bd^2} = \frac{0.85\,\beta_1 \varepsilon_{cu}}{\varepsilon_{cu} + \varepsilon_{fu}}\left(1 - \frac{\beta_1 \varepsilon_{cu}}{2(\varepsilon_{cu} + \varepsilon_{fu})}\right),$$

$$\eta_{max} = \frac{M_{u,max}}{f_c bd^2} = \frac{0.85\,\beta_1 \varepsilon_{cu}}{\varepsilon_{cu} + \varepsilon_y}\left(1 - \frac{\beta_1 \varepsilon_{cu}}{2(\varepsilon_{cu} + \varepsilon_y)}\right),$$

wherein $\beta_1$ represents a second stress rectangle coefficient; $\varepsilon_{cu}$ represents an ultimate strain of concrete; $\varepsilon_{fu}$ represents an ultimate strain of FRP; and $\varepsilon_y$ represents a steel bar yield strain;

a process of determining the minimum steel bar area and the maximum FRP bar area according to the maximum steel bar area specifically comprises:

obtaining a preset step size;

gradually reducing a steel bar area and increasing an FRP bar area from the maximum steel bar area according to the preset step size, and determining a current ductility after reducing the steel bar area each time;

calculating an error between the current ductility and the target ductility;

determining whether the error is less than an allowable error; and if no, stopping reducing the steel bar area and increasing the FRP bar area to obtain the minimum steel bar area and the maximum FRP bar area; and a process of determining the actual steel bar area and the actual FRP bar area according to the third preset condition, the minimum steel bar area, and the maximum FRP bar area specifically comprises:

determining a steel bar selection range as $A_{s,min} \leq A_s \leq A_{s,max}$ and an FRP bar selection range as $0 \leq A_f \leq A_{f,max}$ when the carrying capacity and the target ductility are met; and according to actual engineering requirements, selecting a steel bar area $A_{s,min} \leq A_s \leq A_{s,max}$ and an FRP bar area $0 \leq A_f \leq A_{f,max}$, and guaranteeing $M_u \geq M_{de}$ and $\mu_0 \geq M_{de}$, wherein $A_s$ represents the actual steel bar area; $A_f$ represents the actual FRP bar area; $A_{s,min}$ represents the minimum steel bar area; $A_{f,max}$ represents the maximum FRP bar area; $M_u$ represents a bending moment in an ultimate state; and $\mu_0$ represents an actual ductility.

* * * * *